Patented June 9, 1953

2,641,557

UNITED STATES PATENT OFFICE 2,641,557

PAPER WITH IMPROVED PRINTING CHARACTERISTICS

Barrett K. Green, Dayton, Ohio, assignor to The National Cash Register Company, Dayton, Ohio, a corporation of Maryland No Drawing. Application November 18, 1948, Serial No. 60,839

3 Claims. (Cl. 117—152)

This invention relates to paper with improved printing characteristics, and more particularly pertains to paper in which needle-like particles of clay material are used to impart bleed resistance with reference to printing inks.

Kaolin, both natural and treated, has universal use as a filler and coating material in the making of printing papers, one of its characteristics being to prevent ink bleed.

It has been found that an improved printing paper can be made by using, instead of kaolin, clay materials having a major portion of the particles in the form of needle-shaped crystals which in packed relation cause a brush-heap structure having high absorptive and adsorptive characteristics due to the increased volume of inter-crystalline space and increased surface area afforded for adsorption because of the shape of the crystals and because of the fact that crystalline surface areas are not masked by packing with or covering by other materials.

Attapulgite, sometimes known as Attapulgus clay, is outstanding in its needle-shaped structure, availability and cheapness for the purpose of this invention.

The needle-shaped clay material may be used as a filler incorporated in the paper or as a coating on the printing surface of the paper.

Therefore, it is an object of this invention to provide an improved printing paper utilizing needle-shaped clay material as an ink bleed resistor.

Another object of the invention is to use such material as a filler for paper or as a coating constituent for the printing surfaces thereof.

With the above and other objects in view and in view of economies and utilities of the invention which will appear from the specification and claims to follow, the invention will be described with reference to a preferred embodiment and to other embodiments all incorporating the novel features.

In the preferred embodiment attapulgite is used as a paper coating constituent, the attapulgite being incorporated in a fluid binder and applied to the paper by any paper coating machine, or otherwise, and dried. The paper coating may be made as follows: first, cook 20 per cent by weight of paper coating starch in water at 200° Fahrenheit for 15 minutes and allow it to cool to room temperature; second, disperse 1 part by weight of attapulgite in 3 parts by weight of water, by use of a ball mill or otherwise; and third, mix four parts, by weight of the attapulgite dispersion with one part, by weight, of the starch solution. The resultant mixture is applied to the paper at room temperature and dried. The surfaces coated may be calendered if desired. A coating of .0005 of an inch, when dried, is of sufficient thickness, but may be varied as desired.

Casein, polyvinyl alcohol, animal glue and other known paper coating binders may be used in place of starch.

In another embodiment of the invention, the clay material is incorporated in the paper stock before it is run onto the paper making machine. The filling may be in the amount ordinarily used when kaolin is employed.

The superior adsorbent and absorbent structures made in the paper by use of the needle-like shape of the particular needle-shaped clay materials employed is responsible for the improved bleed resistance evidenced by papers made with them.

Having thus described my invention, what is claimed is:

1. Printing paper including as adsorptive ink bleed resistant print-receiving material particles of solid material the major portion of which are particles of attapulgite in its needle-shaped crystalline form and in its adsorptive condition.

2. The printing paper of claim 1 in which the attapulgite is incorporated as a filler in the making of paper.

3. The printing paper of claim 1 in which the attapulgite is applied as a constituent of a print-receiving paper surface coating.

BARRETT K. GREEN.

References Cited in the file of this patent

UNITED STATES PATENTS

| Number | Name | Date |
| --- | --- | --- |
| 2,307,239 | Rowland | Jan. 5, 1943 |

OTHER REFERENCES

"Clays" by H. Ries, pub. by John Wiley and Sons, 1927, 3rd edition, pages 380–381.